March 5, 1957　　　H. V. BOLDING　　　2,783,692
PRODUCTION OF PROTECTIVE CARTONS
Original Filed April 30, 1954　　　5 Sheets-Sheet 1
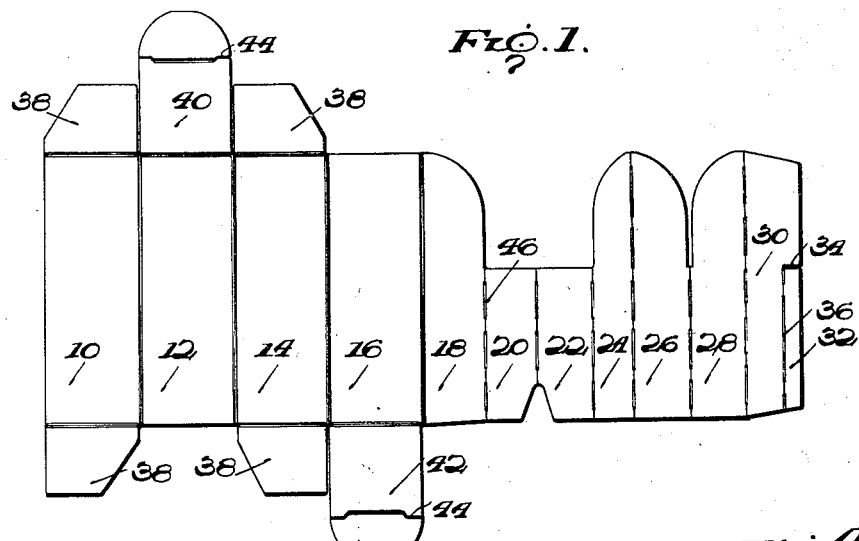
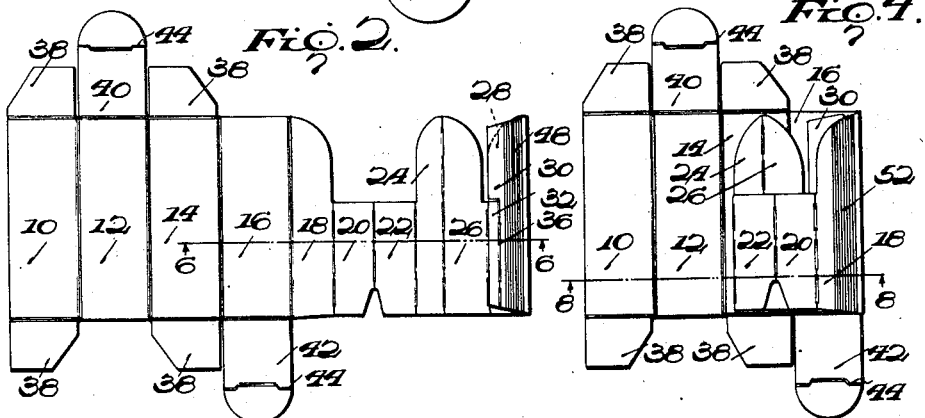
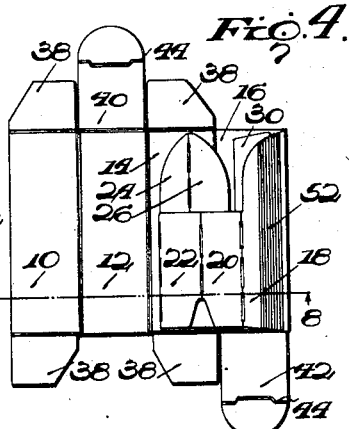
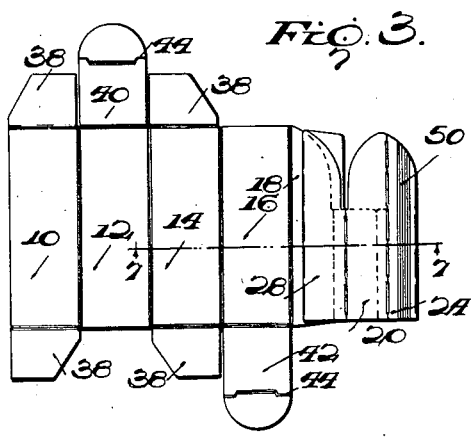
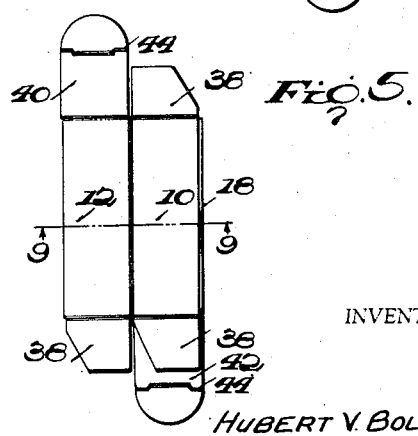
INVENTOR
HUBERT V. BOLDING
BY
ATTORNEY

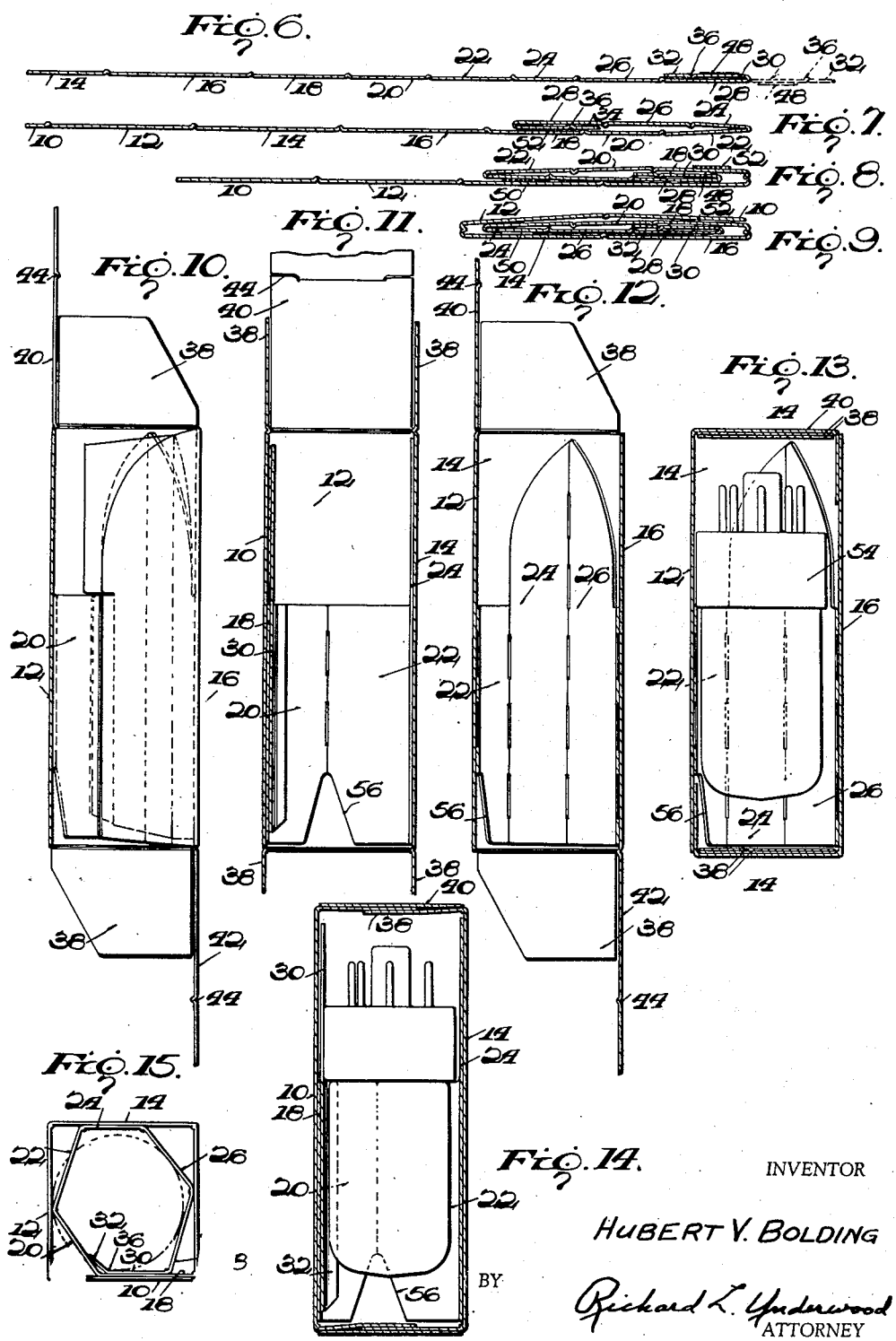

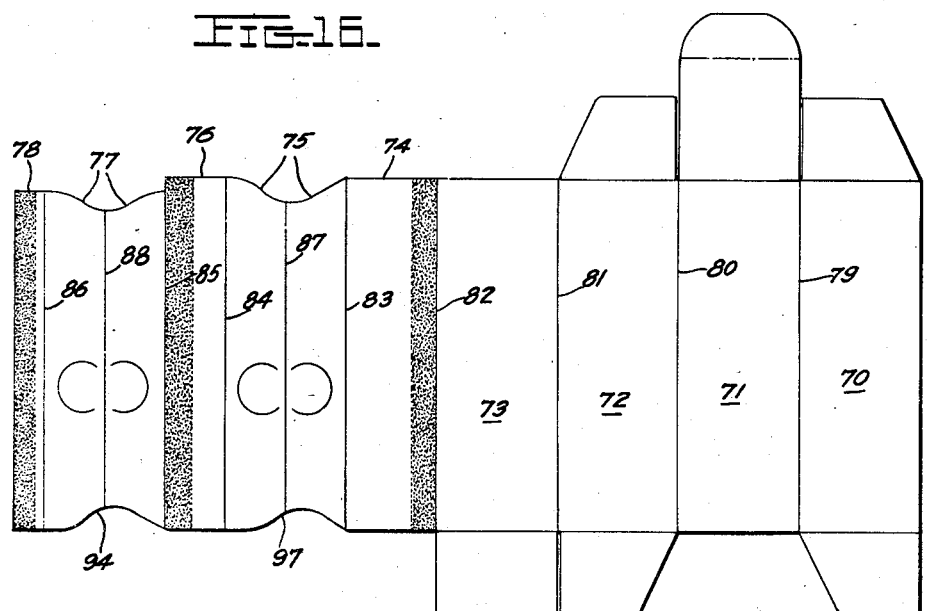
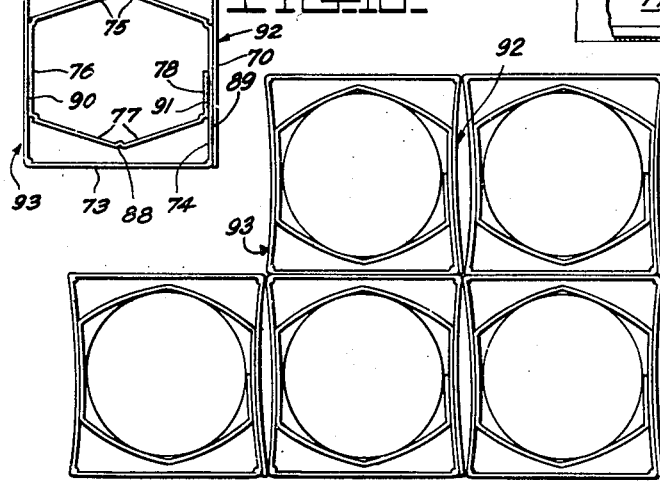
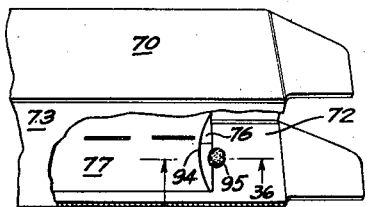
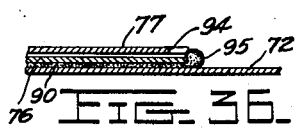
INVENTOR
HUBERT V. BOLDING
BY
ATTORNEY

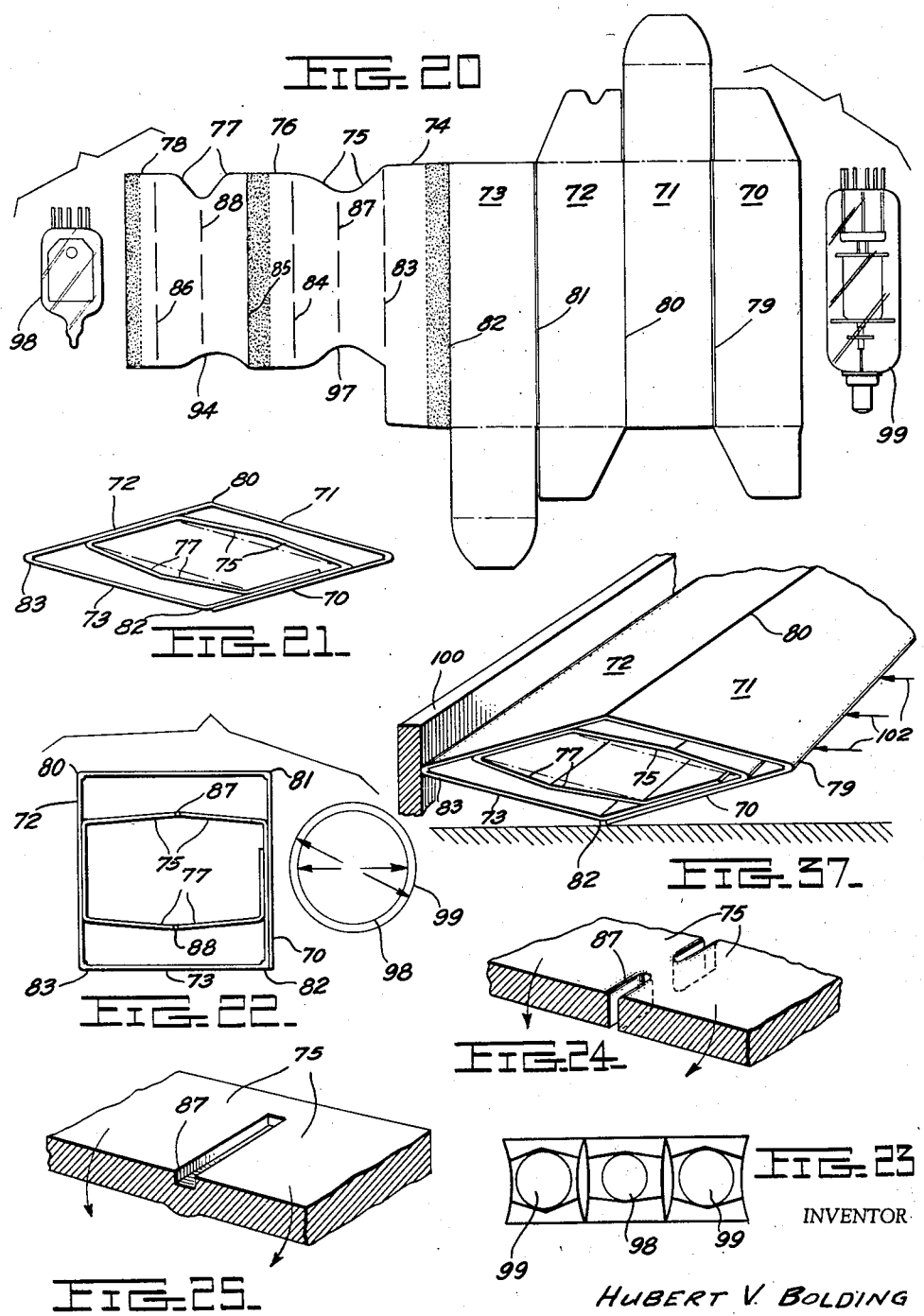

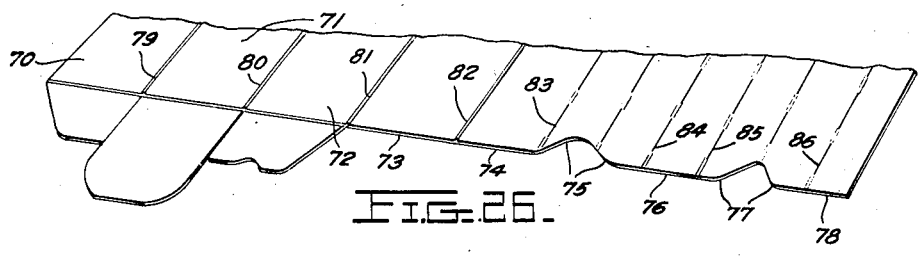
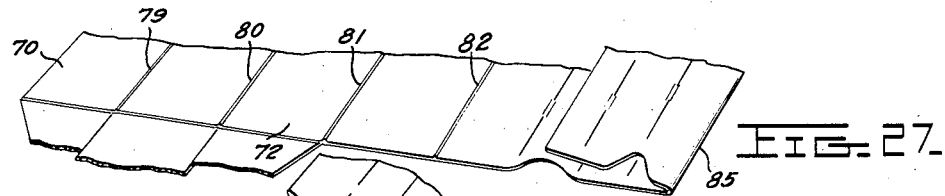
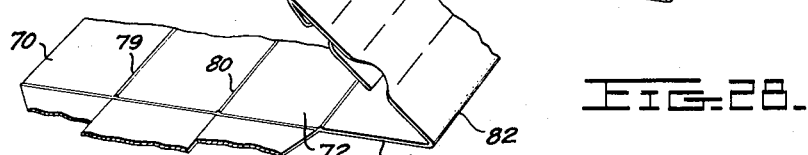
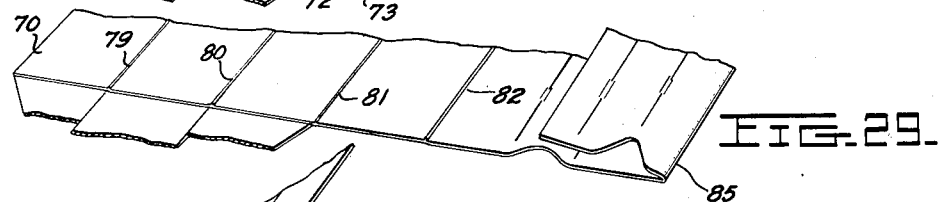
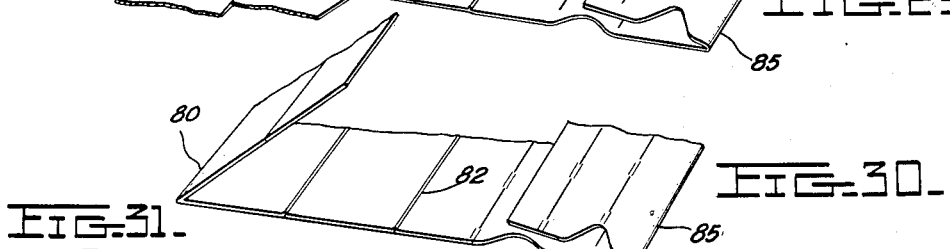
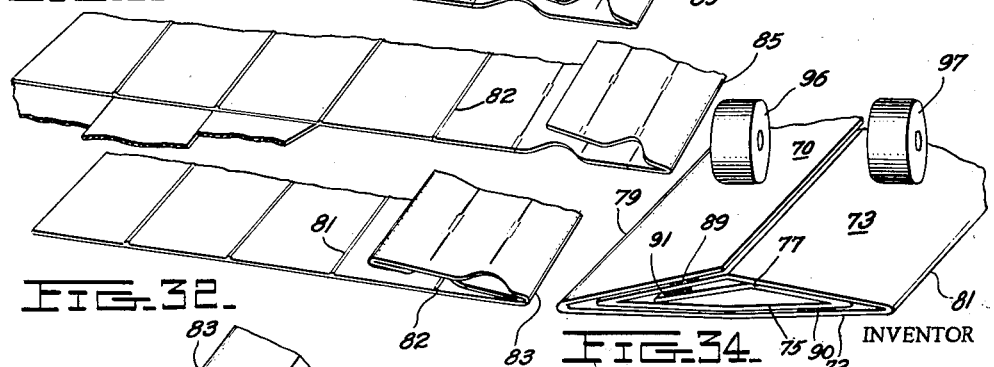
INVENTOR
HUBERT V. BOLDING
BY
ATTORNEY

United States Patent Office 2,783,692
Patented Mar. 5, 1957

2,783,692

PRODUCTION OF PROTECTIVE CARTONS

Hubert V. Bolding, Clarksville, Ind., assignor to The Bradley & Gilbert Company, Louisville, Ky., a corporation of Kentucky Original application April 30, 1954, Serial No. 426,642, now Patent No. 2,732,122, dated January 24, 1956. Divided and this application December 12, 1955, Serial No. 552,432

5 Claims. (Cl. 93—49)

My invention is directed to the method of forming and the structure of a collapsible shock-proof box.

This application is a division of my application Serial No. 426,642, filed April 30, 1954, now Patent No. 2,732,122 issued January 24, 1956, this latter application being a continuation-in-part of my original application Serial No. 304,061, filed August 13, 1952, now Patent No. 2,764,337 issued September 25, 1956.

In the collapsible box field it has been found necessary to provide a box formed from a single blank and capable of cushioning completely a very delicate item such as a radio tube. This box must be easily manufactured on automatic machinery and, therefore, must involve a minimum of folds and glued panels. My invention produces a box which meets this need by requiring three folds from one side and one fold from the other side. Three glued areas requiring merely two glue-pressing operations are included.

More specifically the box must be capable of mass production by standard machinery; it must be designed to be readily insertable in collapsed condition into a radio tube loading machine; it must be easily erectable to loading position without failure; and it must safely cushion a delicate radio tube under severe shock conditions. In the past, it was the practice to merely provide a wedging action on the tube in the box, whereby movement was somewhat arrested. While complicated designs for complete cushioning were well known, none of them were useful for machine loading because of the many failures during the erection operation. Losses due to machine shut-down were prohibitive. The problem presented to the box industry was a difficult one. The simple wedge-type boxes previously developed and used were easily manufactured and involved no grave problem of erection due to their simplicity. These boxes of the prior art were satisfactory for properly cushioning the comparatively rugged and large tubes used in the past; they were completely unsatisfactory for use with the new delicate tubes.

Recently the radio and television industry developed small and extremely delicate tubes which replace the large and rugged tubes previously used. My invention has provided a box which meets this pressing need.

The box is rectangular in cross section and has an upper cradle and a lower cradle, these being slightly wider than the top and bottom wall of the box to form an inner hex liner. By suitable means the upper cradle is biased upwardly and the lower cradle is biased downwardly. The distance between the upper and lower cradle is such that upon loading an article such as a radio tube, the side walls of the box are drawn inwardly providing concave side walls. When stacked together, the adjacent side walls provide a cushioning space of the order of about $\frac{1}{16}$ to $\frac{1}{8}$ of an inch which prevents damaging contact of the sides of the articles. The spacing of the upper and lower cradle members from the top and bottom of the box provides air cushion space for the top portion and bottom portion of the radio tube. The glue paths are along the sides of the box; the hardened glue, plus the panels and walls which make up the side pillars, carry the complete weight of the radio tube.

"Intelligence" is imparted to the box by my invention. Through this, fool-proof automatic loading is possible. The collapsed carton is similar to a flattened parallelogram, the fold lines of the two lateral edges being bent 180 degrees. The fold lines at the flattened middle portion of the outer box are imparted with "intelligence" through my method of pre-breaking these joints during manufacture of the box. These fold lines have a built-in tendency toward proper erection. By providing predetermined cut scores and skip cuts at the fold lines of the inner liner, the liner itself is erectable in the proper manner; its cradles belly upwardly and downwardly in a predetermined manner.

The above-described structure and "built-in intelligence" has proved itself in actual production. Prior to my invention, complete-cushion boxes failed in machine use. Failures were due to doubling over of the collapsed box rather than erection, bowing inwardly instead of outwardly of the cradle panels, and other similar faults.

In designing a collapsible box for use in automatic machinery, it is highly desirable that the force needed at any instant during the erection process be held to a minimum. I believe my box is progressively set up; that is, it appears that the magnitude of the erection force at any instant is reduced to a minimum. This is due to the breaking of the joints in succession rather than all at one time.

Various other objects and meritorious features of the invention will be apparent from the following description taken in conjunction with the drawings wherein like numerals refer to like parts throughout the several figures and wherein:

Fig. 1 is a plan view of the single integral blank from which the carton is formed;

Fig. 2 is a similar view illustrating an initial stage in forming the carton;

Figs. 3 and 4 illustrate subsequent successive steps in making the collapsed carton;

Fig. 5 is a side elevation of the completely erected carton;

Figs. 6–9 are sections through lines 6—6, 7—7, 8—8 and 9—9 of Figs. 2, 3, 4 and 5, respectively;

Fig. 10 is a side elevation of an erected carton with a side wall removed;

Fig. 11 is a central transverse vertical section;

Fig. 12 is a central longitudinal vertical section;

Fig. 13 is a view similar to Fig. 12 illustrating the carton loaded with a tube;

Fig. 14 is a view similar to Fig. 11 illustrating a carton loaded with a tube;

Fig. 15 is a bottom plan view of a loaded carton open at its end;

Fig. 16 illustrates a blank on reduced scale for forming a modified hexagonal liner type of carton;

Fig. 17 is a transverse cross section through the carton showing the carton in partially collapsed form;

Fig. 18 is a view similar to Fig. 17 showing the carton in open or erected condition;

Fig. 19 is a view showing a group of cartons of Fig. 18 loaded and stacked;

Fig. 20 illustrates a blank on reduced scale for forming a carton for the small radio tubes shown;

Fig. 21 is a view similar in type to Fig. 17 showing the carton in partially collapsed form;

Fig. 22 is a view similar in type to Fig. 18 and showing two diameters of tubes which can be housed;

Fig. 23 is a line diagrammatic view showing a group of loaded cartons of Fig. 22;

Fig. 24 is an enlarged view showing a skip cut;

Fig. 25 is an enlarged view showing a cut score;

Figs. 26–34, inclusive, show the steps in making the collapsed carton, Fig. 34 showing the gluing operation also;

Figs. 35 and 36 are sectional views, Fig. 36 being taken on line 36—36, showing the glue bead which is formed by the gluing operation; and Fig. 37 shows the erection of the carton from the collapsed condition.

Referring now to Figs. 1–15 wherein is shown the carton of my previously mentioned application Serial No. 304,061, Fig. 1 illustrates the basic integral blank which comprises adjacent outer wall panels and inner panels delineated by parallel weakened lines and including successively four outer wall panels 10, 12, 14 and 16, a lap panel 18, a buffer panel having adjacent inside buffer panel sections 20 and 22, an anchor panel 24, a buffer panel having adjacent buffer panel sections 26 and 28, and anchor panel 30. Anchor panel 30 may embody a valve flap 32 severed from the anchor panel at 34 and flexibly connected thereto by the weakened line 36. The inside face of the blank is illustrated in Fig. 1.

Conventional side closure flaps 38 are flexibly connected to the upper and lower ends of wall panels 10 and 14 by weakened lines, and top and bottom main closure flaps 40 and 42 are similarly flexibly connected to the upper and lower ends, respectively, of wall panels 12 and 16. Flaps 40 and 42 are notched as indicated at 44 on each side to secure or lock the flap in place when the carton is closed.

While I have referred broadly to the use of "weakened lines" which connect the parallel walls and panels heretofore described, it is of some importance to note that the connections between wall panels 10, 12, 14, and 16 and panel 18 are in the form of score lines whereas the connections between the other panels described consist of successive slots 46 (Fig. 1) die cut in the material and separated from one another by score lines.

The manner in which the carton is assembled or erected is clearly illustrated in Figs. 2–5. The initial step consists in folding over anchor panel 30 upon buffer panel section 28. The thus exposed outer surface of anchor panel 30 is coated with adhesive along a margin thereof as indicated at 48, leaving valve flap 32 uncoated.

The right-hand end of the blank as illustrated in Fig. 2 is then folded over along the weakened line separating panels 22 and 24 and the gummed surface 48 is adhered to the inner surface of lap panel 18. The outer surface of anchor panel 24 is adhesively coated as illustrated at 50.

The right-hand portion of the blank as arranged in Fig. 3 is then folded over along the weakened line separating lap panel 18 from wall panel 16 and anchor panel 24 is adhered to wall 14 by means of the adhesive 50.

As noted in Fig. 4, the exterior surface of lap panel 18 is adhesively coated as indicated at 52 and in the final folding operation above the weakened line separating wall panels 12 and 14 and exterior face of lap panel 18 is adhered to the inside face of end wall panel 10.

The carton or box completely erected and in flat condition ready for expanding into carton loading form is illustrated in Fig. 5.

When pressure is exerted on the ends of the flat erected carton illustrated in Fig. 5, the same opens to form a rectangular carton the formation of which is fully illustrated in Figs. 10–15. It will be noted that anchor panel 24 is of less width than wall 14 to the inner surface of which it is adhered and that it is secured to such wall intermediate the sides thereof. Likewise the adhered portion of anchor panel 30, i. e., that portion lying inside the valve flap 32, is of less width than outer wall 10 to which it is adhered indirectly over the lap panel 18, and this anchor panel also is disposed centrally of the wall 10 intermediate the sides thereof.

By reason of this disposition of the anchor panels substantially centrally of the contiguous outer wall panels, the buffer panels 20—22 and 26—28 which extend between the anchor panels are so disposed that each respective buffer panel section extends diagonally across a corner formed by the outer wall panels of the carton. However, the only points of securement are the gummed surfaces heretofore described in conjunction with the erection of the carton. In effect the four buffer panel sections and two anchor panels form a hexagonal sleeve disposed symmetrically within the rectangular carton, which sleeve, by virtue of the manner in which it is secured to the carton walls, collapses readily into flat form with the four walls of the carton and opens easily in the same manner when pressure is applied to the ends of the flat carton.

For the particular use being described herein for illustrative purposes, i. e., radio tube packaging, buffer panel sections 20 and 22 extend throughout only a portion of the length of the carton whereas the other buffer panel sections 26 and 28 extend substantially the full length of the carton. When erected the interiorly disposed edges of buffer panel sections 20 and 22 form a seat against which the non-glass base 54 engages when the tube is inserted in the carton. Thus when loading the tube the operator need grasp only its non-fragile base 54 and the glass portion which is inserted first is not subjected to any pressure whatsoever. Once the tube is seated on the ledge provided by buffer panel sections 20 and 22 and the ends of the carton are closed, it will be apparent that the loaded carton may be dropped and that the glass and filament therein are proofed against shock regardless of how the loaded carton may fall or on what portion thereof it may land.

It will be noted that the valve flap 32 associated with anchor panel 30 is of substantially the same height as buffer panel sections 20 and 22. This arrangement permits substantial width to anchor panel 30 along that portion above the valve flap, all of which anchor panel with the exception of the valve flap may, for purposes of strength and rigidity, be adhered to end wall 10. As the flattened carton is opened or expanded and the buffer panel section 20 moves into its diagonal position across the corner of the carton, valve flap 32 opens inwardly from the carton wall and permits this movement of the buffer panel away from the adjacent walls of the carton. If anchor panel 30 is made sufficiently narrow, the valve flap 32 may be dispensed with since no portion of the anchor panel 30 will impede movement of buffer panel section 20 as the carton is opened.

At least one pair of buffer panel sections is notched inwardly along their line of joinder from the margins thereof as shown at 56 (Fig. 10). In the form illustrated the notch is located at the outer ends of the adjoining panels. It should be borne in mind that this carton is adaptable to packaging a variety of articles in protective, shock-proof fashion. Notching as shown at 56 imparts a certain amount of flexibility to the notched end of that portion of the buffer wall and enables the same to accommodate itself to various modified sizes and shapes of articles.

Fig. 15 shows the somewhat off-center positioning of the inner hex liner which facilitates proper erection of the liner within the box. This was achieved by gluing the upper anchor panel 24 somewhat to the left of center and the lower lap panel 18 and lower anchor panel somewhat to the right of center.

Referring now to the other three sheets of drawing which include Figs. 16–37, it will be seen in Fig. 16 that the blank includes a series of four successive outer wall panels 70, 71, 72 and 73 and a series of at least five successive inner panels 74, 75, 76, 77 and 78. The outer wall panels 70–73 are delineated by four successive score lines 79, 80, 81 and 82. The inner panels are delineated by four successive cut score lines 83, 84, 85 and 86. A portion of a cut score is shown in section in Fig. 25. The buffer panels 75 and 77 are upper and lower cradle panels, respectively (Fig. 18) and have belly cut scores 87 and 88, respectively, at their longitudinal median lines.

Fig. 18 shows the completed box in erected condition. Starting with the side wall panel 70, it will be noted that the blank is spirally wound inwardly in a counterclockwise direction. The inner face of the side wall panels 70 is glued to one face of the lap panel 74, the other face of panel 74 being glued to the end anchor panel 78. On the left side of the box in Fig. 18, the intermediate anchor panel 76 is glued to the inner face of the side wall 72. It will be noted that there are two glue paths 89 and 91 on the right side of the box and one glue path 90 on the left side. Further, it will be noted that the cradle panels 75 and 77 are spaced from the top wall panel 71 and the bottom wall panel 73, respectively, when the box is unloaded as well as loaded (Fig. 19). The cradle panels 75 and 77 must have a wider dimension than the top wall panel 71 and the bottom wall panel 73; that is, the width of the cradle members must be large enough to cause a bellying thereof when the box is in erected condition. Further the liner is accurately centralized within the outer box.

To provide means for inducing a predetermined upward bellying action to cradle panel 75 and downward bellying action to cradle panel 77, belly cut scores 87 and 88, respectively, are made at their longitudinal median lines, the cut portion being at the top for panel 75 and at the bottom for panel 77 (Fig. 18).

The previously described similar cut scores 83, 84, 85 and 86 aid in the production of the proper bellying action when the box is erected.

Fig. 19 shows a group of loaded and stacked boxes. By a predetermined vertical spacing of the cradle panels 75 and 77, the side wall panel 70 and the side wall panel 72 are caused to be pulled inwardly at their longitudinal median portion upon insertion of a radio tube. The cradle panels 75 and 77 are forced apart and through the panels 74, 76 and 78 cause the walls 70 and 72 to be concaved. Upon stacking these loaded cartons, the corners only of the side of the boxes are in contact and side cushions of air are provided outside the boxes. Top and bottom cushions of air are provided by each box individually since the cradle panels are spaced to have no effective bearing on upper and lower walls 71 and 73.

One supporting pillar 92 having five layers is formed by the side wall 70, glue 89, side panel 74, glue 91 and anchor panel 78. A second supporting pillar 93 having three layers is formed by the side wall 72, glue 90, and intermediate anchor panel 76. These two pillars support the radio tube.

Figs. 20–24 show a box of considerably smaller size than that just described. The same numerals have been applied where appropriate for clarity. It is constructed of the same basic blank with modifications discussed below. In the erected condition of Fig. 22, the counterclockwise spiral wind is seen to be the same. It will be noted that the inherent bow of the upper and lower cradle panels 75 and 77 is not as pronounced as in the larger box (Fig. 18). The bow is induced by belly skip cuts 87 and 88 made at the longitudinal median lines of the upper and lower cradle panels 75 and 77, respectively, an example of the skip cut being shown in Fig. 24. Skip cuts are provided also at fold lines 83, 84, 85 and 86.

Figs. 20, 22 and 23 show the versatility of the unique design of my invention. Small tube 98 and large tube 99 are known in the industry as the "five and one-half" and the "six and one-half." These tubes are very delicate in nature. The actual diameter of tube 98 is about one-half inch. Previously two separate boxes of different dimensions were required to properly house these tubes. My invention enables the packaging of these tubes in boxes having the same dimensions, and as seen in the diagrammatic view, Fig. 23, which has been slightly exaggerated for clarity, the concave side walls are produced by each tube. Fig. 22 shows the two diameters of the tubes for which the box was designed.

It will be noted in Fig. 20 that the liner panels (75, 76, 77 and 78) are of less length than the outer walls. Through this design, the power needed for erecting the box from collapsed condition and for pushing the tube into the box is reduced to an absolute minimum without sacrificing the cushioning features of the box.

Figs. 26–34, inclusive, show the folding method for producing the "intelligent" box of my invention. The blank of Fig. 26 has been cut and scored; it is ready for final folding and gluing. The inner face of the blank faces upwardly; the folding steps are as follows:

*Fig. 27.*—The blank is folded about panel fold line 85 into face-to-face contact with itself;

*Fig. 28.*—The blank is then pre-broken at fold line 82 to impart "intelligence" to this fold line;

*Fig. 29.*—The blank is then returned to its previous unbent condition of Fig. 27;

*Fig. 30.*—The blank is then pre-broken at fold line 80 to impart "intelligence" to this fold line;

*Fig. 31.*—The blank is then returned to its previous unbent condition of Fig. 29;

*Fig. 32.*—The resultant double thickness blank portion is then folded about the fold line 83 into face-to-face contact with the rest of the blank;

*Fig. 33.*—The resultant triple thickness blank portion is then folded in the same direction about fold line 81 into face-to-face contact with the remainder of the blank;

*Fig. 34.*—And finally the outer wall panel 70 is folded in the opposite direction into face-to-face contact with a portion of the resultant four-thickness blank portion.

The "intelligence" imparted to the fold line 80 and the fold line 82 is developed by bending or pre-breaking the blank about 90 degrees. In practice it has been found that the range of 90–180 degrees is satisfactory. The preferred degree of bending is 120 degrees.

Figs. 35 and 36 show the glue-bead feature wherein a glue-bead cutout 94 is provided in the lower cradle panel 77 to prevent contact of the edge of this panel with the glue-bead 95. As seen in Fig. 34, the blank, after folding, is pressed by rollers 96 and 97 positioned laterally inwardly of the edges of the box. As these rollers move relative to the folded box, they cause adherence of the glued panels to each other and cause the formation of small glue-beads at the downstream end of the carton liner. In the box of my invention, glue-beads are formed at the end of glue paths 89 and 91 on one side and at the end of the glue path 90 on the other side. Glue-bead cutout 94 prevents contact of cradle panel 77 with glue-bead 95 (Figs. 35 and 36), and glue-bead cutout 97 prevents contact of the squeezed out glue of paths 89 and 91 with cradle panel 75. As seen in Fig. 36, the glue-bead extends upwardly to the height of the cradle panel, but due to the glue-bead cutout does not contact it.

It will be noted that the two rollers which accomplish the gluing operation are spaced inwardly of the lateral edges of the folded box. The fold lines 79 and 81 have, as previously described, been folded 180 degrees; the gluing operation is specifically designed to prevent "ironing" of these fold lines. These particular fold lines are, therefore, not strained to any extreme and may be opened up by a minimum of force.

Fig. 37 shows the box in partially erected condition with the fold line 81 abutting a stop 100 and the arrows 102 showing the position of the erecting force. It is believed that due to the predetermined length of the cradle panels 75 and 77 and the inherent bellying action thereof, that each joint, from the first to the last, is progressively affected; that is, the joints are successively broken. In this manner the magnitude of force at any instant is reduced to a minimum. The total amount of power required to erect the box is also reduced to a minimum.

The advantages of this may be readily appreciated upon viewing the condition of the joints or fold lines of the collapsed box of Fig. 37. Two joints 80 and 82 have been pre-broken, and the other joints have been strained in predetermined manners. The box is "intelligent." The box is capable of proper response to small erection forces. The obviously dangerous features of large forces of crushing strength, therefore, may be avoided, and failures reduced almost to non-existence. Instead of violently breaking each joint of the outer box and liner at one time, my invention facilitates smoother and more certain erection by relatively smaller forces.

From the foregoing it will be apparent on examination of the modification disclosed in Fig. 15 and that disclosed in Figs. 18 and 22 that applicant has provided a carton readily and easily formed from a single blank, which carton embodies a cushioning support within the outer walls of the carton. The cushioning support is capable of protecting the most fragile articles from contact with the outer walls and consequent risk of breakage.

With particular reference to Figs. 18 and 22 wherein the blanks disclosed in Figs. 16 and 20 are shown in erected form, it will be seen that the blank comprises a series of successive panels 70, 71, 72, 73, 74, composite buffer or cushion panel 75, 76, composite buffer or cushion panel 77 and an anchor panel or tab 78. Each component of the composite buffer or cushion panels 75 and 77 is of substantially equal width and size and each of the pairs 75 and 77 is of greater width than the intermediate or supporting panel 76 which is adhered to the inner face of wall 72.

The five adjoining panels 70, 71, 72, 73 and 74 extending from one end of the blank form the outer box or carton, panels 70 and 74 being adhesively secured together. The remaining five panels comprising the components of buffer or cushion panels 75 and 77, together with the intermediate narrower panel 76, form a cushion supported inside the box or carton. Panel 74, as stated, is adhesively secured to the inner face of panel 70 and may be regarded as a lap panel joining the outer box with the interior cushion. The tab or anchor panel 78 is adhered to the inner face of this joining or lap panel 74.

I claim:

1. A method of making a collapsible shock-proof box from a single blank having an inner face and an outer face, the box being rectangular in cross section when erected and having a series of four successive outer walls and a series of at least five successive inner panels, which comprises the steps of scoring the blank in a parallel manner to provide a series of four, wall fold lines which delineate the four successive outer walls of the outer box and a contiguous series of at least four, panel fold lines which delineate the five successive inner panels of the inner liner, folding the blank about its third panel fold line into inner face-to-face contact with itself, pre-breaking the blank at the fourth wall fold line by bending the resultant double thickness blank in the same direction about 90 degrees, returning said resultant double thickness blank to its immediately previous unbent condition, pre-breaking the blank at the second wall fold line by bending the wall end of the blank about 90 degrees in the opposite direction, returning the wall end of the blank to its immediately previous unbent condition, folding said resultant double thickness blank portion in said same direction about the first panel fold line into face-to-face contact with the remainder of the blank, folding said resultant triple thickness blank portion in said same direction about the third wall fold line into face-to-face contact with the remainder of the blank, and folding the first outer wall in said opposite direction into face-to-face contact with a portion of the resultant four-thickness blank portion; the resulting outer box and inner box being collapsed and having cross sections similar to flattened parallelograms; the first and third fold lines of said outer walls being at the lateral extremities of the collapsed box; and connecting the first wall, the first side panel, and the fifth anchor panel together to prevent relative movement therebetween.

2. A method in accordance with claim 1 wherein each of the two pre-breaking steps bend the blank about 120 degrees.

3. A method in accordance with claim 1 wherein each of the two pre-breaking steps bend the blank an amount within the range of 90 degrees to 180 degrees.

4. A method of making a collapsible shock-proof box in accordance with claim 1 from said single blank which further includes glue-bead cut-outs at the longitudinal ends of the second and fourth panels and wherein the connecting step includes the provision of longitudinal paths of glue between the first wall and the first, side panel, and between the first, side panel and the fifth, anchor panel, and including the further step of providing a longitudinal path of glue between the third wall and the third, side panel, and pressing the glued areas of the walls and panels together, said longitudinal paths of glue being positioned laterally inwardly of the lateral extremities of the collapsed box to enable pressing of the glued areas without deleteriously ironing the first and third fold lines.

5. A method in accordance with claim 1 and including the further step of connecting the third wall and the third side panel together to prevent relative movement therebetween.

No references cited.